Oct. 15, 1968          D. H. SCHULER          3,405,955
SELF-RETRACTING JACK SUPPORT FOR A WAGON TONGUE
Original Filed June 11, 1964
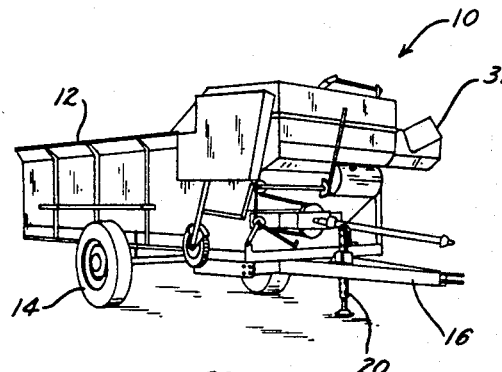
Fig. 1
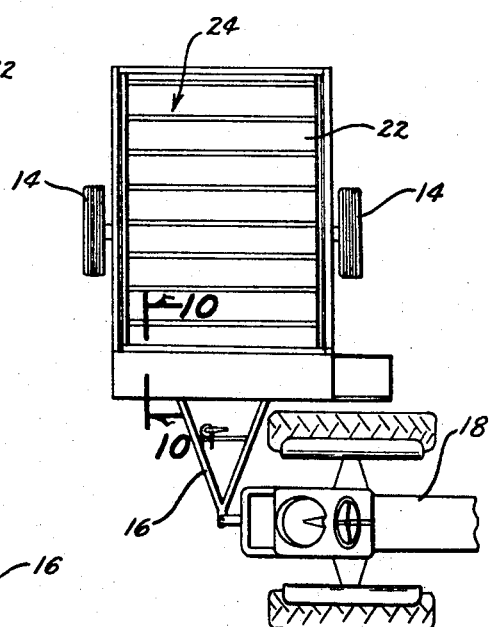
Fig. 2
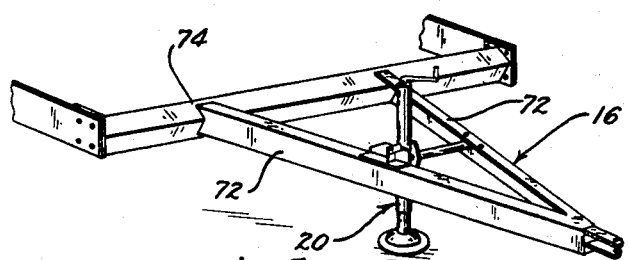
Fig. 3
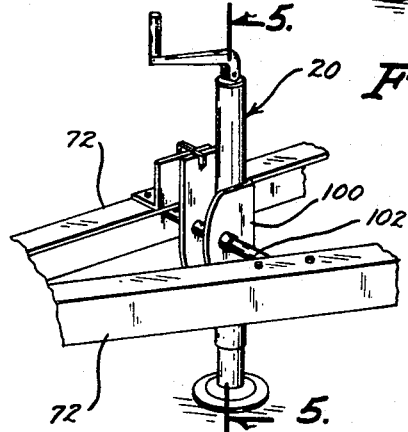
Fig. 4
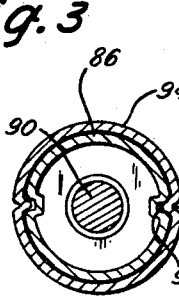
Fig. 6
Fig. 5
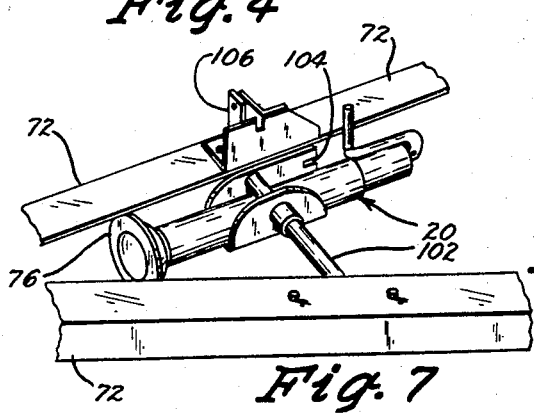
Fig. 7
INVENTOR
DORLAND H. SCHULER
BY
*Dickey, Zarley, McKee, Thomte*
ATTORNEYS

United States Patent Office 3,405,955
Patented Oct. 15, 1968

3,405,955
SELF-RETRACTING JACK SUPPORT FOR
A WAGON TONGUE
Dorland H. Schuler, Griswold, Iowa 51535
Original application June 11, 1964, Ser. No. 374,455, now
Patent No. 3,273,733. Divided and this application July
28, 1966, Ser. No. 568,614
8 Claims. (Cl. 280—475)

ABSTRACT OF THE DISCLOSURE

A device for trailer-type vehicles including a jack support pivotally connected to a V-shaped tongue at a point on the jack wherein the center of gravity is so located to cause the jack to normally pivot the base end thereof upwardly against the converging end of the V-shaped tongue. Means is provided for locking the jack in a vertical upright position.

---

This is a divisional application of my co-pending application Ser. No. 374,455 filed June 11, 1964, and now Patent No. 3,273,733.

The grain wagon of this invention is described in detail in applicant's co-pending application and includes the operation of filling the wagon with grain and commercial feed and by the use of a conveyor system discharging the mixture from the wagon and returning it to the wagon, thereby mixing it as it moves through the cycle of operation. When the blending and mixing operation has been completed, the return feed material conveyor is positioned for discharge of the feed at a feeding station or the like.

The jack support of this invention has as an object the providing of a jack support structure which will automatically move to an inoperative position when the wagon has been hitched to a tractor or the like.

A still further object of this invention is to provide a grain wagon having a front end stationary support means which may be quickly positioned for supporting the front end of the wagon while separated from the tractor or the like.

A still further object of this invention is to provide a farm wagon having a tongue structure which permits the tractor or the like pulling the wagon to turn at an angle of 90 degrees to the wagon.

It is a further object of this invention to provide a grain wagon having a jack support which is simple in design, economical to manufacture and refined in appearance.

This invention consists in the construction, arrangements, and combination, of the various parts of the device, whereby the objects contemplated are attained as hereinafter more fully set forth, specifically pointed out in the claims, and illustrated in the accompanying drawings, in which:

FIGURE 1 is a perspective view of the wagon from the forward end thereof;

FIGURE 2 is a top plan view of the wagon connected to a farm tractor and in particular showing the tractor positioned at a 90 degree angle to the wagon;

FIGURE 3 is a perspective view showing only the wagon frame construction in combination with the wagon tongue and jack support assembly;

FIGURE 4 is a fragmentary perspective view of the jack support assembly in its position of use;

FIGURE 5 is a cross sectional elevational view taken along line 5—5 in FIGURE 4 and showing in detail the construction of the jack support assembly;

FIGURE 6 is a cross sectional view taken along line 6—6 in FIGURE 5; and

FIGURE 7 is a fragmentary perspective view similar to FIGURE 4, but showing the jack support assembly in its transport position.

The wagon of this invention is referred to in FIGURE 1 generally by the reference numeral 10 and includes the wagon box 12 carried on a set of wheels 14. A tongue assembly 16 is provided at the forward end of the wagon 10 and used both to support the front end of the wagon by its connection to a tractor 18 (FIGURE 2) or a jack assembly 20 when disengaged from a tractor or the like.

The tongue assembly 16 (FIGURE 3) is V-shaped in construction and includes a pair of members 72 which are fixedly secured to a transverse wagon frame member 74 at points substantially offset inwardly from the outer ends of the transverse member 74. The member 74 is hollow and square in cross section and is turned 45 degrees such that each pair of diagonally opposite corners are disposed in horizontal and vertical planes. By this positioning, the transverse member 74 presents a substantially stronger connection to the free ends of the tongue members 72. The greatest forces exerted on the transverse member 74 are along the horizontal and vertical planes coinciding with the two diagonal planes extending through the two pairs of opposite corners of the transverse member 74. By having the additional strength in the transverse member 74, it is possible to offset inwardly the members 72 of the tongue 16 and thereby enable the tractor 18 to make a sharp 90 degree turn without intereference from the wagon tongue as best illustrated in FIGURE 2.

To simplify the wagon's construction, only a single set of wheels 14 have been provided and thus when the tractor 18 or the like is disengaged therefrom, a support means at the front end of the wagon is required. As illustrated in FIGURES 1 and 7, the jack assembly 20 is provided and carried by the tongue 16. In FIGURE 5, the jack 20 is shown to include a base ground engaging convex member 76 having a center opening 78 formed therein which receives a pin 80. A head element 82 is welded onto the lower end of the pin 80 to prevent its upward movement through the center opening 78. However, angular movement relative to the vertical is permitted since the pin 80 is substantially smaller in diameter than the opening 78 in the base 76. The upper end of the pin 80 is welded to a head 84 which in turn is welded to a tube 86 inwardly from its lower end which is in bearing engagement with the outer convex surface of the base member 76. The upper end of the tube 86 is provided with a threaded member 88 which receives a threaded shaft 90 connected to a handle 92. A second tube 94 telescopically embraces the tube 86 and rotatbly receives through its upper end the shaft 90. To prevent relative rotation between the tubes 86 and 94, they each are provided with a pair of grooves 96 and ribs 98 in mating engagement with each other along their outer surfaces diametrically opposite each other. Thus, as the handle 92 is rotated, the tubes 86 and 94 move towards and away from each other depending on the direction of rotation of the handle 92.

The outer tube 94 of the jack assembly 20 is fixedly secured to a U-shaped bracket 100 which is mounted on a shaft 102 extending between the tongue members 72. A notch 104 is formed in the upper end of one leg of the U-shaped member 100 for locking engagement with a latch 106 mounted on the tongue member 72 (FIGURE 7) whereby the jack assembly 20 may be held in a locked upright vertical position as illustrated in FIGURE 4 for supporting the front end of the wagon 10.

The weight of the jack assembly 20 is distributed relative to the axis of rotation along the shaft 102 such that upon disengagement of the latch 106 from the notch 104, the jack 20 will automatically pivot to a horizontal position as illustrated in FIGURE 7. The rotational movement of the jack 20 is limited by the tongue member 72 serving as stop means since the base 76 of the jack 20 cannot pivot therebetween. When it is desired to return the jack 20 to its upright vertical position, it is only necessary to overcome the natural offcenter rotational forces of the jack 20 about the shaft 102. With the latch 106 in engagement with the notch 104 and the U-shaped bracket 100, the jack 20 is held positively in its vertical upright position. When the jack 20 is not in use, the handle 92 may be pivoted to its out-of-the-way position represented by the dash lines 92 in FIGURE 5.

From a consideration of the foregoing disclosure, it will be obvious that all of the initially recited objects of the present invention have been achieved.

Some changes may be made in the construction and arrangement of my grain wagon without departing from the real spirit and purpose of my invention, and it is my intention to cover by my claims, any modified forms of structure or use of mechanical equivalents which may be reasonably included within their scope.

I claim:

1. A jack support apparatus for a trailer-type vehicle, tongue means having two opposite ends, one end being adaptable for operative connection to the forward end of a trailer-type vehicle and the other end being adapted for detachable securement to the rearward end of a pulling vehicle, a jack support pivotally secured at a point intermediate its ends but away from its center of gravity to said tongue means, such that the balance of weight of said jack support normally pivots it to a horizontal position from an upright vertical position, a means for locking said jack support in a vertical position to support said tongue above a support surface, and means for limiting the upward pivotal movement of said jack support.

2. The structure of claim 1 wherein said last mentioned means includes said tongue means which includes spaced apart V-shaped legs which converge towards each other at the forward end of said tongue means, with the pivotal position of said jack support being such that the lower end thereof will engage the converging legs of said tongue means when said jack support is in a substantially horizontal position whereupon said converging legs will limit the pivotal movement of said jack support.

3. The structure of claim 2 wherein a stop means is mounted on said tongue means in such a position that it prohibits the pivotal movement of the top portion of said jack support from a vertical position towards the V-shaped end of said tongue means.

4. The structure of claim 2 wherein said jack support is pivotally connected at a point offset from the longitudinal axis of said jack support.

5. The structure of claim 2 wherein said jack support is longitudinally extendible and retractable between a fully extended position and a fully retracted position, said jack support means being pivotally connected at a point offset from the longitudinal axis of said jack support.

6. The structure of claim 1 wherein said jack support is pivotally connected to said tongue means at a point remote from the longitudinal axis of said jack support.

7. The structure of claim 1 wherein said jack support is pivotally secured to said tongue means so that the pivotal axis of said jack support is below the center of gravity of said jack support and is laterally spaced from the longitudinal axis of said jack support.

8. The structure of claim 1 wherein said tongue means includes spaced apart V-shaped legs which converge towards each other at the forward end of said tongue means, with the position of said jack support means substantially rearwardly remote from the converging end of said V-shaped legs.

References Cited

UNITED STATES PATENTS

| | | | |
|---|---|---|---|
| 2,168,906 | 8/1939 | Leary | 254—86 |
| 2,205,436 | 6/1940 | Richards | 254—86 |
| 3,273,733 | 9/1966 | Schuler | 280—475 |

FOREIGN PATENTS 645,078  10/1950  Great Britain.

LEO FRIAGLIA, *Primary Examiner.*